May 24, 1966     C. F. THOMPSON ET AL     3,252,935
VINYL CHLORIDE POLYMER COMPOSITION AND METHOD
OF COATING THEREWITH
Filed June 20, 1960
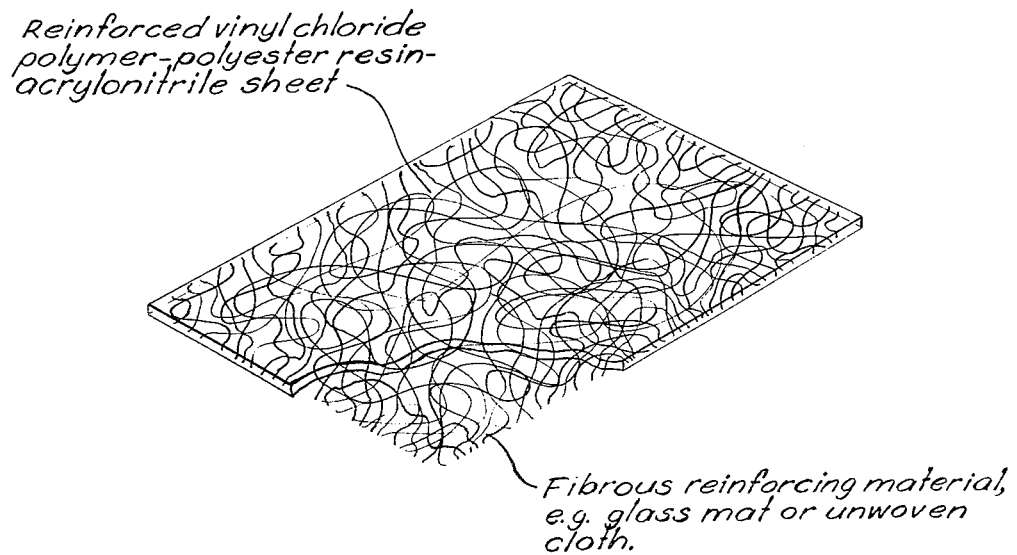
Reinforced vinyl chloride polymer-polyester resin-acrylonitrile sheet
Fibrous reinforcing material, e.g. glass mat or unwoven cloth.
INVENTORS.
Clifford F. Thompson
Louis C. Rubens
BY Griswold & Burdick
ATTORNEYS United States Patent Office 3,252,935
Patented May 24, 1966

3,252,935
VINYL CHLORIDE POLYMER COMPOSITION AND
METHOD OF COATING THEREWITH
Clifford F. Thompson and Louis C. Rubens, Midland,
Mich., assignors to The Dow Chemical Company, Midland, Mich., a corporation of Delaware
Filed June 20, 1960, Ser. No. 37,044
4 Claims. (Cl. 260—40)

This invention concerns fluid vinyl chloride polymer compositions containing acrylonitrile and capable of being converted to cross-linked polymeric products. It pertains especially to rigid cross-linked vinyl chloride polymeric products containing acrylonitrile polymerized therein and having reinforcing fibrous material embedded in the polymeric product and a method for making the compositions and the cross-linked polymeric products.

Vinyl chloride polymers and compositions thereof comprising the vinyl chloride polymers and plasticizers are useful for a variety of purposes in the home and industry. One method for making molded or shaped articles from vinyl chloride polymers consists in blending or dispersing the finely divided vinyl chloride polymer in a liquid plasticizer to form a flowable mixture which can be poured into a mold, heating to fuse or solvate the polymer with the plasticizer, after which the heated material is cooled to produce a shaped article conforming to the configuration of the mold. Such dispersions of vinyl chloride polymers in a liquid plasticizer are known to the art as plastisols and they are commonly employed in preparing molded or shaped articles of vinyl chloride polymers. Articles prepared from plasticized vinyl chloride polymers, particularly plastisols, are usually relatively soft flexible products which restricts greatly the utility for which the vinyl chloride polymers are otherwise well suited.

Cross-linked or rigid vinyl chloride polymer compositions are prepared by blending the finely divided vinyl chloride polymer with a difunctional monomer, i.e. a monomer containing two ethylenically unsaturated groups in the molecule and capable of addition polymerization, to form a fluid composition or plastisol, and after shaping of the plastisol and heating it to fuse the polymer, curing or polymerizing of the difunctional monomer is effected to produce a rigid cross-linked polymeric article.

It is a primary object of the invention to provide a method for making fluid vinyl chloride polymer compositions containing acrylonitrile which are capable of being converted to rigid cross-linked vinyl chloride polymer products without the need of heating the composition to fuse the polymer prior to converting the composition to a rigid or cross-linked condition. Another object is to provide fluid vinyl chloride polymer compositions of the plastisol type containing acrylonitrile, which are capable of being converted into rigid cross-linked vinyl chloride polymer products without fusing of the polymer prior to the cross-linking step. Still another object is to provide a method for making such rigid cross-linked vinyl chloride polymer products. Still another object is to provide a method for making rigid cross-linked vinyl chloride polymer products having reinforcing fibrous material embedded therein. A further object is to provide cross-linked vinyl chloride polymer products containing interpolymerized acrylonitrile and having reinforcing fibrous material embedded therein. Other and related objects will appear from the following description of the invention.

According to the invention the foregoing and related objects are obtained by blending or dispersing a finely divided vinyl chloride polymer in the form of discrete particles, preferably of the plastisol grade, in a liquid mixture of polymerizable monomers consisting essentially of a monovinyl aromatic compound of the benzene series, a polyethylenically unsaturated aliphatic organic compound copolymerizable with the monovinyl aromatic compound, and acrylonitrile in proportions as hereinafter stated to form a fluid mixture or plastisol at ordinary temperatures. The fluid mixture of the vinyl chloride polymer dispersed in the liquid monomers is readily converted into a rigid cross-linked polymeric product by subjecting the mixture to the action of high energy ionizing radiation. More specifically, it has been found that the fluid mixture comprising the vinyl chloride polymer particles dispersed in the liquid mixture of monomers containing monomeric acrylonitrile can readily be converted to rigid cross-linked polymeric products having good mechanical properties, without the need of heating the mixture to fuse or solvate the polymer, prior to subjecting it to high energy ionizing radiation. In the preparation of cross-linked polymeric products having reinforcing fibrous material embedded therein, the fluid mixture or composition of the vinyl chloride polymer dispersed in the liquid monomers is coated or buttered onto a mat or woven sheet of the fibrous material or the fibrous material is immersed in the fluid composition after which it is pressed into a predetermined shape and thickness. Thereafter, the shaped material can be cured by interpolymerization of the monomers in intimate contact with the vinyl chloride polymer. Such interpolymerization is carried out by subjecting a layer of the fluid mixture or a body of the pressed and shaped material to the action of high energy ionizing radiation at an intensity and for a total dose as hereinafter defined. The material can be irradiated with the high energy ionizing radiation while having the finely divided vinyl chloride polymer dispersed as discrete particles in the liquid mixture of monomers, or alternatively, the material can be pressed and shaped and heated at elevated temperatures, e.g. at from about 70° to 150° C., to fuse or solvate the polymer with the monomers, after which the fused or solvated polymeric material is irradiated, although heating to fuse or solvate the polymer with the monomers is not required. It may be mentioned that somewhat smaller amounts of total dosages of radiation are effective to initiate and polymerize the monomers containing acrylonitrile than is required to interpolymerize monomers with the polymer in the absence of acrylonitrile under otherwise similar conditions, and rigid compositions possessing substantially greater mechanical properties are obtained with acrylonitrile-containing monomers without heating at elevated temperatures to solvate and fuse the polymer and monomers into a homogeneous gel-like phase, prior to irradiating to polymerize the monomers, than is obtained in the absence of the acrylonitrile.

The vinyl chloride polymers to be employed in the invention can be polyvinyl chloride or a copolymer that contains at least 80 percent by weight of vinyl chloride chemically combined or interpolymerized with not more than 20 percent by weight of another monoethylenically unsaturated monomer or monomers such as vinyl acetate, vinyl propionate, methyl acrylate, butyl acrylate, methyl methacrylate, butyl methacrylate, acrylonitrile, vinylidene chloride and the like. The vinyl chloride polymers are of the plastisol grade, i.e. they are of solid dense particles of average diameters in the range of from 0.5 to 2.0 microns, and are readily converted into plastisols by thorough stirring with a plasticizer, e.g. dioctyl phthalate.

The monovinyl aromatic compounds to be employed in the invention are the liquid monomers of the benzene series having the general formula:

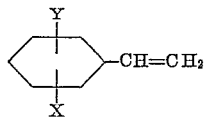

wherein X and Y each represents a member of the group consisting of hydrogen, halogen and lower alkyl radicals containing from 1 to 3 carbon atoms. Examples of such monomers are styrene, vinyltoluene, vinylxylene, ethylvinylbenzene, isopropylstyrene, chlorostyrene, dichlorostyrene, bromostyrene, fluorostyrene, ar-ethyl ar-chlorostyrene, ar-methyl ar-chlorostyrene and diethylstyrene.

The polyethylenically unsaturated organic monomers to be employed in the invention can be an organic compound of the group consisting of: (a) esters of monobasic unsaturated aliphatic acids such as acrylic acid and methacrylic acid and a hydroxy compound of the group consisting of vinyl alcohol, allyl alcohol, methallyl alcohol, glycerol, 1,3-propanediol and glycols and polyglycols having the general formula $HO-(C_nH_{2n}O)_m-H$, wherein $n$ is a whole number from 2 to 3 and $m$ is an integer from 1 to 14 with the proviso that said polyglycols have an average molecular weight not substantially greater than 600 such as the di-, tri-, tetra-, penta-, and up to tetra-decyl ethylene glycols and the di-, tri-, tetra-, penta-, and up to decyl propylene glycols; and (b) esters of polybasic aliphatic acids such as maleic acid, fumaric acid, itaconic acid and citraconic acid and glycols and polyglycols having the general formula given above; and (c) unsaturated polyesters of maleic acid or fumaric acid and glycols having the general formula $HO-(C_nH_{2n}O)_m-H$, wherein $n$ is a whole number from 2 to 3 and $m$ is an integer from 1 to 2, which unsaturated polyesters have a molecular weight between 258 and 2000. The acrylonitrile can be employed in amounts corresponding to from 5 to 50 percent by weight of the sum of the weights of the total monomers initially used.

The fluid compositions of the invention are prepared by mixing or intimately dispersing from 35 to 50 percent by weight of a finely divided solid vinyl chloride polymer of the plastisol type in the form of discrete particles with from 50 to 65 percent by weight of a liquid mixture of polymerizable monomers consisting essentially of from 40 to 92.5 percent by weight of at least one monovinyl aromatic compound of the benzene series having the general formula

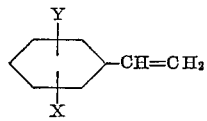

wherein X and Y each represents a member of the group consisting of hydrogen, halogen and lower alkyl radicals containing from 1 to 4 carbon atoms, from 5 to 50 percent by weight of acrylonitrile and from 55 to 2.5 percent by weight of a polyethylenically unsaturated organic compound copolymerizable with the monovinyl aromatic compound and selected from the group consisting of the esters of acrylic acid and methacrylic acid and an alcohol or polyol of the groups (a) and (b) herein defined, with the resultant production of a mobile to viscous flowable composition, having an absolute viscosity between 250 and 9000, preferably from 250 to 2000, centipoises at 25° C.

Such flowable compositions can readily be poured or forced into a mold cavity, spread as a layer on a flat plate or belt or on a mat or sheet of fibrous material such as cloth, wood fibers, cotton linters, glass fibers, glass cloth, paper and the like, then pressed and cured to form molded rigid articles or laminates suitable for a variety of purposes.

In a specific embodiment the fluid compositions are employed to impregnate or coat fibrous materials such as a mat or woven cloth of glass fibers to produce rigid vinyl chloride polymeric products having the reinforcing fibrous material embedded therein.

The fluid compositions comprising the finely divided particles of vinyl chloride polymer dispersed in the mixture of polymerizable monomers are converted to gels upon solvating of the particles of vinyl chloride polymer by the monomers, frequently upon standing at room temperature or thereabout, but preferably by heating at a temperature of about 135° C. or above with or without the application of pressure, although such heating to fuse or solvate the polymer particles is not required.

The compositions are cured or converted to rigid polymeric products by polymerization of the monomers under the action of high energy ionizing radiations such as high speed electrons, gamma ray, X-rays and the like. Convenient sources of such radiations are Van de Graaff generators, Cobalt-60 and X-ray machines.

The high energy radiation to be employed is preferably of an intensity corresponding to at least 40,000 rads per hour and is used in amount corresponding to a total dose of from about 0.4 to 10 megarads.

It may be mentioned that the rate of cure or rate of polymerization of the monomers in the fluid compositions is dependent in part upon the dose rate or intensity of radiation. In general, the lower the dose rate, the lower is the total dose required to cure or completely polymerize the monomers, and correspondingly the lower the intensity the greater is the time required for a given total dose. A higher dose rate requires a greater total dosage within the ranges stated to polymerize the monomers, but effects the polymerization in a shorter period of time.

The "rad" adopted by the Seventh International Congress of Radiology—Copenhagen, 1953, is a unit of absorbed dose which corresponds to the absorption of 100 ergs per gram of the irradiated material at the dosage site.

The total dose of high energy ionizing radiation required to cure or polymerize the monomers to produce a rigid polymeric product will vary somewhat depending in part upon the proportions of the monomers employed and in part upon the sensitivity of the monomers to be polymerized by high energy ionizing radiations. Greater dosages than about 10 megarads of the radiation can be used, but in general, higher dosages of irradiation tend to cause deterioration and discoloring of the polymeric product, and are to be avoided.

The following examples illustrate ways in which the principle of the invention has been applied but are not to be construed as limiting its scope.

EXAMPLE 1

A composition was prepared by blending 50 grams of finely divided polyvinyl chloride of plastisol grade with a solution of 26.7 grams of a mixture of approximately 67 percent by weight of m-vinyltoluene and 33 percent of p-vinyltoluene, 2.4 grams of ethylene glycol dimethacrylate, 10 grams of acrylonitrile and 10.9 grams of an unsaturated polyester consisting of the reaction product of propylene glycol and maleic acid, which polyester had a molecular weight between 500 and 600. The mixture was blended and stirred under reduced pressure to remove air bubbles. It was a flowable composition at room temperature. A portion of the composition was poured into an aluminum pan mold to form a layer 4 x 4 inches by ⅛ inch deep. The layer was exposed to high speed electrons from a Van de Graaff accelerator operating at a beam current of 75 microamperes and 2 mev. potential for a total dose of 1.4 megarads. The irradiated layer was a transparent rigid sheet. It was tested and found to have the properties reported under A below.

EXAMPLE 2

A flowable composition was prepared by blending 50 grams of polyvinyl chloride of plastisol grade with a liquid mixture consisting of 26.7 grams of vinyltoluene of about 67 percent by weight of m-vinyltoluene and 33 percent p-vinyltoluene, 10.9 grams of an unsaturated polyester consisting of the reaction product of propylene glycol and maleic acid which polyester had a molecular weight between 500 and 600, 2.4 grams of ethylene glycol dimethacrylate and 10 grams of acrylonitrile. The dispersion of the polyvinyl chloride in the monomers was poured onto two plies of 1.5 oz. per square foot of fiber glass mat and was pressed in an aluminum pan mold to form a sheet having the dimensions of 4 x 4 x ⅛ inches. The sheet was exposed to high speed electrons from a Van de Graaff accelerator operating at a beam current of 75 microamperes and 2 mev. for a total dose of 1.6 megarads.

The drawing is a view partly broken away illustrating the reinforced resin sheet of experiment A.

In each of a series of experiments, a charge of polyvinyl chloride of plastisol grade was blended with a solution of vinyltoluene, ethylene glycol dimethacrylate, unsaturated polyester and acrylonitrile in proportions as stated in the following table to form a flowable composition. The vinyltoluene employed in the experiments was a fraction consisting of approximately 67 percent by weight of m-vinyltoluene and 33 percent of p-vinyltoluene. The unsaturated polyester employed in the experiments was a polyester consisting of the reaction product of approximately equimolar proportions of ethylene glycol and maleic anhydride, which polyester had a molecular weight between 500 and 600. A portion of the composition was poured in an aluminum pan mold to form a layer 4 x 4 inches by ⅛ inch deep. The layer was cured or the monomers polymerized by exposing the layer to a beam of high speed electrons from a Van de Graaff accelerator operating at a beam current of 75 microamperes and 2 mev. potential for a total dose as stated in the table. The irradiation was applied at a rate corresponding to from 0.03 to 0.04 megarad per second at the dosage site. The cured products were clear, transparent rigid sheets. They were tested and found to have properties as given in Table I.

*Table 1*

| | Fluid Composition | | | | | Cured Product | | | | |
|---|---|---|---|---|---|---|---|---|---|---|
| Run No. | Polyvinyl Chloride, gms. | Vinyltoluene, gms. | Ethylene Glycol Dimethacrylate, gms. | Polyester, gms. | Acrylonitrile, gms. | Flexural Strength, lbs./sq. in. | Flexural Modulus ×10⁵, lbs./sq. in. | Impact Strength, in.-lbs. | Heat Distortion Temp., °C. | Dose, Megarads |
| 1 | 50 | 33.4 | 3.0 | 13.6 | | 3,600 | 3.8 | 0.7 | 63 | 2.1 |
| 2 | 50 | 30.1 | 2.7 | 12.2 | 5 | 6,310 | 4.0 | 1.5 | 58 | 1.96 |
| 3 | 50 | 26.7 | 2.4 | 10.9 | 10 | 8,573 | 4.2 | 1.2 | 64 | 1.4 |
| 4 | 50 | 23.4 | 2.1 | 9.5 | 15 | 8,800 | 4.3 | 1.8 | 84 | 1.96 |
| 5 | 45 | 22.0 | 2.0 | 9.0 | 22 | 9,780 | 4.8 | 1.5 | 72 | 3.36 |
| 6 | 40 | 24.0 | 2.2 | 9.8 | 24 | 10,765 | 4.8 | 1.6 | 73 | 4.34 |

The cured product was a transparent rigid sheet having a glossy surface and having the reinforcing glass fibers embedded therein. For purpose of comparison a composition was prepared by blending a portion of the polyvinyl chloride with the other ingredients, except that no acrylonitrile was employed in the composition. A layer of this composition was cured by irradiating it with high speed electrons as herein described. The properties of this composition are listed below under B.

| Ingredients | A | B |
|---|---|---|
| Polyvinyl chloride, gms | 50 | 50 |
| Vinyltoluene, gms | 26.7 | 33.4 |
| Ethylene glycol dimethacrylate, gms | 2.4 | 3.0 |
| Unsaturated polyester, gms | 10.9 | 13.6 |
| Acrylonitrile, gms | 10 | |
| Radiation dose, megarads | 1.4 | 2.1 |
| Flexural strength, lbs./sq. in | 8,600 | 3,600 |
| Flexural modulus, lbs./sq. in | 4.2×10⁵ | 3.8×10⁵ |
| Impact strength, in.-lbs | 1.2 | 0.7 |
| Heat distortion temperature, °C | 64 | 63 |

EXAMPLE 4

In each of a series of experiments a charge of finely divided polyvinyl chloride of plastisol grade was dispersed in a liquid mixture consisting of 32 grams of vinyltoluene (67 percent m-vinyltoluene and 33 percent p-vinyltoluene), 10 grams of acrylonitrile and 8 grams of a polyethylenically unsaturated monomer as stated in the following table. A portion of the mixture was poured into an aluminum pan mold to a form a layer 4 x 4 inches by ⅛ inch deep. The layer of the material was cured by passing the same under a beam of high speed electrons from a Van de Graaff accelerator operating at a beam current of 75 microamperes and 2 mev. for a total dose as stated in the table to polymerize the monomers. The irradiation was applied at a rate of from 0.03 to 0.04 megarad per second at the dosage site. The cured products were clear transparent rigid sheets having properties as stated in the table. Table II identifies the experiments and gives the proportions of the ingredients employed in making the same.

Table II

| Run No. | Starting Materials | | | | | Irradiation | Cured Product | | | |
|---|---|---|---|---|---|---|---|---|---|---|
| | Polyvinyl Chloride, gms. | Vinyl-toluene, gms. | Acrylonitrile, gms. | Polyfunctional Monomer | | Total Dose, Megarads | Flexural Strength, lbs./sq. in. | Flexural Modulus × 10⁵, lbs./sq. in. | Impact Strength, in.-lbs. | Heat Distortion Temp., °C. |
| | | | | Kind | Gms. | | | | | |
| 1 | 50 | 32 | 10 | Vinyl acrylate | 8 | 4.48 | 4,610 | 2.49 | 1.0 | 46 |
| 2 | 50 | 32 | 10 | Vinyl methacrylate | 8 | 5.04 | 7,810 | 3.71 | 1.1 | 70 |
| 3 | 50 | 32 | 10 | Allyl methacrylate | 8 | 4.48 | 7,090 | 3.86 | 0.9 | 60 |
| 4 | 50 | 32 | 10 | Ethylene glycol diacrylate | 8 | 3.22 | 9,440 | 3.83 | 2.1 | 74 |
| 5 | 50 | 32 | 10 | Ethylene glycol dimethacrylate | 8 | 1.96 | 9,890 | 4.32 | 1.9 | 95 |
| 6 | 50 | 32 | 10 | Polyester of propylene glycol and maleic acid M.W. 500-600 | 8 | 2.10 | 8,390 | 4.15 | 1.4 | 73 |
| 7 | 50 | 32 | 10 | Ester of maleic acid and polypropylene glycol of M.W. 400 | 8 | 1.28 | 4,580 | 3.64 | 0.9 | 79 |

We claim:

1. A fluid laminating vinyl chloride polymer composition cable of being converted to a cross-linked polymeric product having good adhesion to metals, wood, cellulosic fibers and glass which comprises a homogeneous dispersion of from 35 to 50 percent by weight of a finely divided solid vinyl chloride polymer of the plastisol type in the form of discrete particles suspended in a liquid mixture of from 50 to 65 percent by weight of polymerizable monomers consisting essentially of (1) from 40 to 92.5 percent by weight of monovinyl aromatic compound having the general formula:

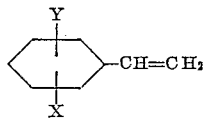

wherein X and Y each represents a member of the group consisting of hydrogen, halogen and lower alkyl radicals containing from 1 to 4 carbon atoms, (2) from 55 to 2.5 percent by weight of a polyethylenically unsaturated organic compound copolymerizable with the monovinyl aromatic compound and selected from the group consisting of: (a) an ester of an unsaturated acid selected from the group consisting of acrylic acid and methacrylic acid with a hydroxy compound selected from the group consisting of vinyl alcohol, allyl alcohol, methallyl alcohol, glycerol, 1,3-propanediol and glycols and polyglycols having the general formula $$HO-(C_nH_{2n}O)_m-H$$

wherein $n$ is a whole number from 2 to 3 and $m$ is an integer from 1 to 14 with the proviso that said polyglycols have an average molecular weight of not more than about 600; and (b) esters of a polybasic acid selected from the group consisting of maleic acid, fumaric acid, itaconic acid and citraconic acid, with a hydroxy compound selected from the group consisting of glycols, and polyglycols having the general formula given above; which unsaturated polyester has an average molecular weight between 258 and 2000, and (3) from 5 to 50 percent by weight of acrylonitrile.

2. A fluid laminating vinyl chloride polymer composition capable of being converted to a cross-linked polymeric product having good adhesion to metals, wood, cellulosic fibers and glass which comprises a homogeneous dispersion of from 35 to 50 percent by weight of a finely divided solid vinyl chloride polymer of the plastisol type in the form of discrete particles suspended in a liquid mixture of from 50 to 65 percent by weight of polymerizable monomers consisting essentially of (1) from 40 to 92.5 percent by weight of a monovinyl aromatic compound having the general formula:

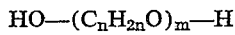

wherein X and Y each represents a member of the group consisting of hydrogen, halogen and lower alkyl radicals containing from 1 to 4 carbon atoms, (2) from 55 to 2.5 percent by weight of a polyethylenically unsaturated organic compound copolymerizable with the monovinyl aromatic compound and selected from the group consisting of: (a) an ester of an unsaturated acid selected from the group consisting of acrylic acid and methacrylic acid with a hydroxy compound selected from the group consisting of vinyl alcohol, allyl alcohol, methallyl alcohol, glycerol, 1,3-propanediol and glycols and polygycols having the general formula $HO-(C_nH_{2n}O)_m-H$ wherein $n$ is a whole number from 2 to 3 and $m$ is an integer from 1 to 14 with the proviso that said polyglycols have an average molecular weight of not more than about 600; and (b) unsaturated polyesters of a polybasic acid selected from the group consisting of maleic acid, fumaric acid, itaconic acid and citraconic acid, with a hydroxy compound selected from the group consisting of glycols and polyglycols having the general formula given above, which unsaturated polyester has an average molecular weight between 258 and 2000, and (3) from 5 to 50 percent by weight of acrylonitrile, said fluid composition having an absolute viscosity between 250 and 2000 centipoises at 25° C.

3. A method for making a cross-linked vinyl chloride polymer product having reinforcing fibrous material embedded therein, which method comprises coating a fibrous material with a fluid vinyl chloride polymer composition consisting essentially of from 35 to 50 percent by weight of a finely divided solid vinyl chloride polymer of the plastisol type in the form of discrete particles suspended in from 65 to 50 percent by weight of a liquid mixture of polymerizable monomers consisting essentially of (1) from 40 to 92.5 percent by weight of a monovinyl aromatic compound having the general formula:

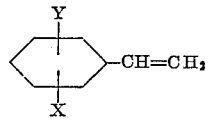

wherein X and Y each represent a member of the group consisting of hydrogen, halogen and lower alkyl radicals containing from 1 to 4 carbon atoms, (2) from 55 to 2.5 percent by weight of a polyethylenically unsaturated organic compound copolymerizable with the monovinyl aromatic compound and selected from the group consisting of: (a) an ester of an unsaturated acid selected from the group consisting of acrylic acid and methacrylic acid with a hydroxy compound selected from the group consisting of vinyl alcohol, allyl alcohol, methallyl alcohol, glycerol, 1,3-propanediol and glycols and polyglycols having the general formula $HO-(C_nH_{2n}O)_m-H$, wherein $n$ is a whole number from 2 to 3 and $m$ is an integer from 1 to 14 with the proviso that said polyglycols have an average molecular weight of not more than about 600; and (b) esters of a polybasic acid selected from the group consisting of maleic acid, fumaric acid, itaconic acid and citraconic acid with a hydroxy compound selected from the group consisting of glycols and polyglycols having the general formula given above, which unsaturated polyester has an average molecular weight between 258 and 2000, and (3) from 5 to 50 percent by weight of acrylonitrile, to form a fluid vinyl chloride polymer composition which as an absolute viscosity between 250 and 9000 centipoises at 25° C., pressing the coated fibrous material into a predetermined thickness and shape and polymerizing the monomers by subjecting the fluid vinyl chloride polymer composition to high energy ionizing radiation in a field having an intensity of at least 0.04 megarad per hour for a total dose of from 0.5 to 10 megarads, whereby the fluid vinyl chloride polymer composition is converted to a rigid cross-linked fiber reinforced plastic body.

4. A rigid cross-linked vinyl chloride polymer composition of matter which comprises a polymeric vinyl chloride composition consisting essentially of from 35 to 50 percent by weight of a finely divided solid vinyl chloride polymer of the plastisol type interpolymerized with from 50 to 65 percent by weight of a mixture of polymerized monomers consisting essentially of (1) from 40 to 92.5 percent by weight of a monovinyl aromatic compound of the benzene series having the general formula:

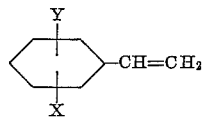

wherein X and Y each represent a member of the group consisting of hydrogen, halogen and lower alkyl radicals containing from 1 to 4 carbon atoms, (2) from 55 to 2.5 percent by weight of a polyethylenically unsaturated organic compound copolymerizable with the monovinyl aromatic compound and selected from the group consisting of: (a) an ester of an unsaturated acid selected from the group consisting of acrylic acid and methacrylic acid with a hydroxy compound selected from the group consisting of vinyl alcohol, allyl alcohol, methallyl alcohol, glycerol, 1,3-propanediol and glycols and polyglycols having the general formula $HO-(C_nH_{2n}O)_m-H$, wherein $n$ is a whole number from 2 to 3 and $m$ is an integer from 1 to 14 with the proviso that said polyglycols have an average molecular weight of not more than about 600; and (b) esters of a polybasic acid selected from the group consisting of maleic acid, fumaric acid, itaconic acid and citraconic acid, with a hydroxy compound selected from the group consisting of glycols and polyglycols having the general formula given above, which unsaturated polyester has an average molecular weight between 258 and 2000 and (3) from 5 to 50 percent by weight of acrylonitrile, having a minor proportion of a reinforcing fibrous material embedded therein.

References Cited by the Examiner

UNITED STATES PATENTS 2,916,469 12/1959 Lal _____ 260—45.5
2,922,768 1/1960 Mino et al.
2,951,772 9/1960 Marzocchi et al. ____ 260—45.4

FOREIGN PATENTS 213,169 2/1958 Australia.

RICHARD D. NEVIUS, *Primary Examiner.*